United States Patent
Belgaied et al.

(10) Patent No.: US 7,788,411 B2
(45) Date of Patent: Aug. 31, 2010

(54) METHOD AND SYSTEM FOR AUTOMATICALLY REFLECTING HARDWARE RESOURCE ALLOCATION MODIFICATIONS

(75) Inventors: Kais Belgaied, Sunnyvale, CA (US);
Nicolas G. Droux, Rio Rancho, NM (US); Sunay Tripathi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1076 days.

(21) Appl. No.: 11/490,582

(22) Filed: Jul. 20, 2006

(65) Prior Publication Data
US 2008/0043765 A1 Feb. 21, 2008

(51) Int. Cl.
*G06F 15/16* (2006.01)
(52) U.S. Cl. .................................. 709/250; 709/226
(58) Field of Classification Search .................. 709/250
See application file for complete search history.

(56) References Cited

U.S. PATENT DOCUMENTS

| | | | |
|---|---|---|---|
| 6,041,053 A | 3/2000 | Douceur et al. |
| 6,070,219 A | 5/2000 | McAlpine et al. |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,177,311 B1 | 2/2007 | Hussain et al. |
| 7,260,102 B2 | 8/2007 | Mehrvar et al. |
| 7,313,142 B2 | 12/2007 | Matsuo et al. |
| 2003/0037154 A1 | 2/2003 | Poggio et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |

OTHER PUBLICATIONS

Dovrolis, C., Thayer, B. and Ramanathan, P.: "HIP: Hybrid Interrupt-Polling for the Network Interface", ACM SIGOPS Operating Systems Review, vol. 35, Iss. 4, Oct. 2001, 11 Pages.

*Primary Examiner*—Vivek Srivastava
*Assistant Examiner*—Ryan J Jakovac
(74) *Attorney, Agent, or Firm*—Osha • Liang LLP (57) ABSTRACT

A method is disclosed that includes assigning a portion of network hardware resources of a host to a virtual network interface card (VNIC), and configuring a virtual machine network stack (VMNS) in a virtual machine (VM) bound to the VNIC to use the portion of network hardware resources assigned to the VNIC. The method also includes performing a modification to the portion of network hardware resources, and automatically reconfiguring the VMNS to adapt to the modification.

13 Claims, 8 Drawing Sheets

METHOD AND SYSTEM FOR AUTOMATICALLY REFLECTING HARDWARE RESOURCE ALLOCATION MODIFICATIONS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367 "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910 ; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,00; "Virtual Switch" with U.S. application Ser. No. 12/580,698; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/479,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/486,943; "Multi-Level Packet Classification" with U.S. application Ser. No. 11/490,745; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method that includes assigning a portion of network hardware resources of a host to a virtual network interface card (VNIC), and configuring a virtual machine network stack (VMNS) in a virtual machine (VM) bound to the VNIC to use the portion of network hardware resources assigned to the VNIC. The method also includes performing a modification to the portion of network hardware resources, and automatically reconfiguring the VMNS to adapt to the modification.

In general, in one aspect, the invention relates to a system that includes a host, a virtual machine (VM) located on the host, a virtual machine network card (VNIC) configured on the host and operatively connected to the VM, and a virtual machine network stack (VMNS) configured in the VM and operatively connected to the VNIC. The host includes network hardware resources, a portion of the network hardware resources is assigned to the VNIC, and the VMNS is configured to use the portion of network hardware resources. The host is configured to perform a modification to the portion of network hardware resources, and the VMNS is configured to automatically adapt to the modification.

In general, in one aspect, the invention relates to a computer usable medium that includes computer readable program code embodied therein for causing a computer system to: assign a portion of network hardware resources of a host to a VNIC; configure a virtual machine network stack (VMNS) in a virtual machine (VM) bound to the VNIC to use the portion of network hardware resources assigned to the VNIC; perform a modification to the portion of network hardware resources; and automatically reconfigure the VMNS to adapt to the modification.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for automatically reflecting modifications made to the allocation of network hardware resources (e.g., hardware rings, hardware ring capacity, and Media Access Control (MAC) addresses) by a host operating system in affected guest operating systems executing on the host. More specifically, embodiments of the invention provide for the automatic reconfiguration of a virtual machine (VM) network stack (VMNS) in response to a modification to the allocation of network hardware resources by a host operating system if the modification affects the VMNS.

Figure 1A:
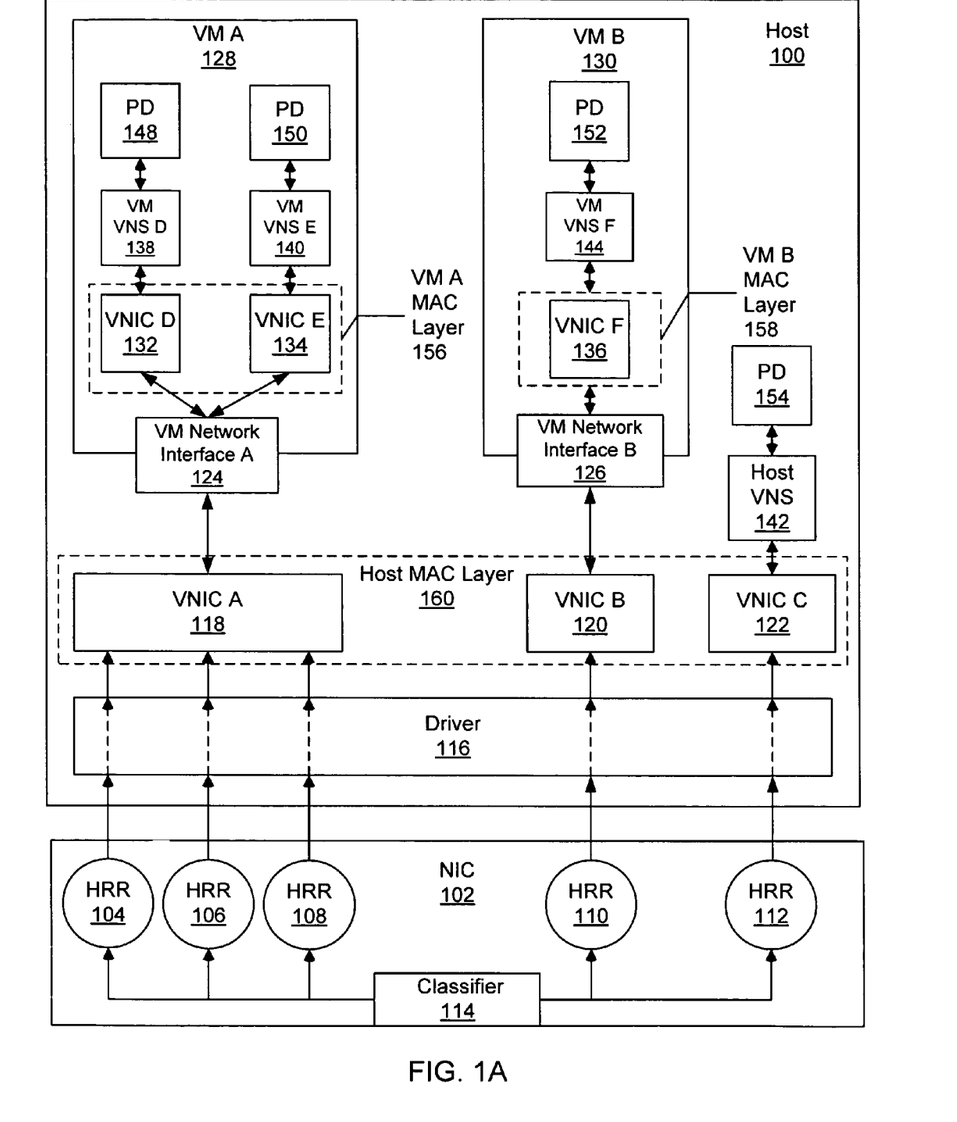
FIGS. 1A-1C, 3A, and 3B show schematic diagrams in accordance with one or more embodiments of the invention.

FIG. 1A shows a system in accordance with one embodiment of the invention. The system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network) (not shown) that receives packets from the network (not shown) and transmits packets from the host (100) to the network (not shown). The NI may correspond to an RJ-45 connector, a wireless antenna, etc. The packets received by the NI from the network (not shown) are forwarded to other components on the NIC (102) for processing. In some embodiments of the invention, the NIC (102) is associated one Media Access Control (MAC) address. In other embodiments, the NIC (102) is associated with two or more MAC addresses. The NIC (102) may transfer data in interrupt mode, in which the NIC (100) alerts the host (100) of an available data transfer, or in polling mode, in which the host (100) requests data from the NIC (102). Those skilled in the art will appreciate that other modes of data transfer, such as programmed Input/Output (I/O) or Direct Memory Access (DMA), may be used for data transfer between the host (100) and the NIC (102).

In one embodiment of the invention, the NIC (102) includes a classifier (114), one or more hardware receive rings (104-112), and one or more hardware transmit rings (not shown). The aforementioned rings may be referred to collectively as hardware rings. In one embodiment of the invention, the hardware receive rings (104-112) and the hardware transmit rings (not shown) correspond to portions of memory within the NIC (102) and are used to temporarily store received packets and packets to be transmitted, respectively. In one or more embodiments of the invention, the hardware receive rings (104-112) and hardware transmit rings (not shown) are implemented as ring buffers in the NIC (102).

In one embodiment of the invention, the classifier (114) is configured to analyze the incoming network traffic, typically in the form of packets, received form the network (not shown). Analyzing individual packets includes determining to which of the hardware receive rings (104-112) each packet is sent. In one embodiment of the invention, analyzing the packets by the classifier (114) includes analyzing one or more fields in each of the packets to determine to which of the receive rings (104-112) the packets are sent. As an alternative, the classifier (114) may use the contents of one or more fields in each packet as an index into a data structure that includes information necessary to determine to which hardware receive ring (104-112) that packet is sent. The classifier (114) may be implemented entirely in hardware (i.e., the classifier (114) may be a separate microprocessor embedded on the NIC (102)), or the classifier (114) may be implemented in software stored in memory (e.g., firmware, etc.) on the NIC and executed by a microprocessor on the NIC (102).

In one or more embodiments of the invention, each hardware receive ring (104-112) is associated with a host virtual network interface card (VNIC) (118, 120, 122). In some embodiments, more than one hardware receive ring (104-112) may be assigned to a host VNIC (118, 120, 122). In some embodiments of the invention, the host VNICs share a single hardware transmit ring (not shown). In other embodiments of the invention in which the NIC (102) includes multiple hardware transmit rings (not shown), each hardware transmit ring may be associated with a host VNIC (118, 120, 122), and more than one hardware transmit ring may be assigned to a host VNIC (118, 120, 122).

In one embodiment of the invention, the host (100) may include the following components: a device driver (116), a host MAC layer (160) including one or more host VNICs (118, 120, 122), a host virtual network stack (VNS) (142) with associated packet destinations (154) (e.g., containers and/or services), one or more VMs (128, 130) (e.g., Xen domains), and one or more VM network interfaces (124, 126). Each VM (128, 130) may include a virtual machine network stack (VMNS) that includes a pseudo NIC (not shown), a VM MAC layer (156, 158) and one or more VM VNSs (138, 140, 144) having associated packet destinations (148, 150, 152).

In one embodiment of the invention, the device driver (116) provides an interface between the hardware receive rings (108, 110, 112) and the host (100). More specifically, the device driver (116) exposes the hardware receive rings (104-112) and the hardware transmit rings (not shown) to the host (100).

In one or more embodiments of the invention, the host MAC layer (160) corresponds to the data link level MAC layer of a network stack. The host MAC layer (160) includes functionality for moving packets between the NIC (102) and the host VNICs (118-122). The host MAC layer (160) also includes functionality for moving packets between each host VNIC (118-122) and the corresponding host VNS (142) or VM network interface (124, 126). The host VNICs (118, 120, 122) included in the host MAC layer (160) provide an abstraction layer between the NIC (102) and the various packet destinations (148, 150, 152, 154) (e.g., containers and/or services) executing on the host (100) and on virtual machines (128, 130) located on the host (100). In one embodiment of the invention, at least one host VNIC (122) may be assigned to a host VNS (142) and other host VNICs (118, 120) may be assigned to VMs (128, 130).

Each host VNIC (118, 120, 122) operates like a NIC (102). For example, in embodiments of the invention, each host VNIC (118, 120, 122) may be associated with one or more Internet Protocol (IP) addresses, associated with one or more MAC addresses, optionally associated with one or more ports, and/or optionally configured to handle one or more protocol types. Thus, while the host (100) may be operatively connected to a single NIC (102), VMs (128, 130) executing on the host (100) operate as if the host (100) is bound to multiple NICs. Those skilled in the art will appreciate that a host VNIC (118, 120, 122) may be defined solely by one or more IP addresses or one or more MAC addresses, and that ports and protocols are not required to instantiate a VNIC.

In some embodiments of the invention, a host VNS (142) includes network layer functionality. Network layer functionality includes functionality to process packets in accordance with various protocols used to send and receive packets (e.g., IP, Address Resolution Protocol (ARP), Internet Control Message Protocol (ICMP), Transmission Communication Protocol (TCP), User Datagram Protocol (UDP), etc.). In one embodiment of the invention, a host VNS (142) is configured to send and/or receive packets from one or more associated packet destinations (154). Further, a host VNS (142) is configured to send and/or receive packets from an associated host VNIC (122) and/or host MAC layer (160). In addition, a host VNS (142) may include functionality to perform additional processing on the incoming and outgoing packets. This additional processing may include, but is not limited to, cryptographic processing, firewall routing, etc.

The host (100) also includes a host operating system (OS) (not shown). In one or more embodiments of the invention, the host OS includes functionality to allocate host network hardware resources to VMs (128, 130) executing on the host (100). In one embodiment, the host OS allocates network hardware resources to a VM (128, 130) by creating a host VNIC (118, 120) for the VM (128, 130) and assigning the desired amount of network hardware resources to the host VNIC (118, 120). As is explained in more detail below, the VM (128, 130) makes use of the assigned network hardware resources via a VM network interface (124, 126).

In some embodiments of the invention, the host OS includes functionality to monitor utilization of the host network hardware resources (e.g., hardware rings, hardware ring capacity, and MAC addresses). In some embodiments of the invention, the host OS includes functionality to modify the allocation of these network hardware resources to the host VNICs (118, 120, 122) automatically based on network traffic (e.g., to reassign the network hardware resources due to over- and/or under-utilization of the resources). In at least one embodiment of the invention, the host OS includes an interface that a system administrator may use to manually reassign the network hardware resources.

In some embodiments of the invention, a modification in allocation of network hardware resources maybe be the assignment of an additional hardware receive ring (104-112) or hardware transmit ring (not shown) to a host VNIC (118, 120, 122), the removal of a hardware receive ring (104-112) or hardware transmit ring (not shown) from a host VNIC (118, 120, 122), the assignment or modification in assignment of a MAC address to a host VNIC (118, 120, 122), a reduction or increase in a capacity of a hardware receive ring (104-112), etc.

In one embodiment of the invention, each VM (128, 130) shares host resources (e.g., one or more central processing units (CPU), memory, etc.) (not shown) with other VMs (128, 130) on the host (100). As discussed above, a VM (128, 130) on a host (100) may include one or more packet destinations (148, 150, 152). In one embodiment of the invention, the packet destination(s) corresponds to any process or group of processes executing on a virtual machine of the host that sends and receives network traffic. Examples of packet destinations include, but are not limited to, containers, services (e.g., web server), etc.

In some embodiments of the invention, each VM (128, 130) includes an operating system (OS) instance (i.e., a guest OS) (not shown), which may be different than the host OS and different from the OS instance of the other virtual machines.

In one or more embodiments of the invention, each guest OS is configured to operate as if the OS is interfaced to a physical NIC having the network hardware resources allocated to a host VNIC (118, 120) that is assigned to the VM (128, 130). For example, as shown in FIG. 1A, the guest OS (not shown) executing on VM A (128) operates as if the OS is associated with a physical NIC having three hardware receive rings, and the guest OS (not shown) executing on VM B (130) operates as if the OS is associated with a physical NIC having only one hardware receive ring.

In one or more embodiments of the invention, a VM MAC layer (156, 158) corresponds to the data link level MAC layer of a network stack. A VM MAC layer (156, 158) includes functionality for moving packets between the VM VNICs (132, 134, 136) and a VM network interface (124, 126). A VM MAC layer (156, 158) also includes functionality for moving packets between each VM VNIC (132, 134, 136) and the corresponding VNSs (138, 140, 144) on top of the VM MAC layer (156, 158). The VM VNICs (132, 134, 136) provide an abstraction layer between a pseudo NIC (PNIC) (not shown) in a VM network interface (124, 126) and the various packet destinations (148, 150, 152) (e.g., containers and/or services) executing on a VM (128, 130). The functionality of embodiments of a VM network interface and a PNIC are explained in more detail below in reference to FIGS. 1B and 1C.

Each VM VNIC (132, 134, 136) operates like a NIC (102). For example, in embodiments of the invention, each VM VNIC (132, 134, 136) may be associated with one or more Internet Protocol (IP) addresses, associated with one or more MAC addresses, optionally associated with one or more ports, and/or optionally configured to handle one or more protocol types. Those skilled in the art will appreciate that a VM VNIC (132, 134, 136) may be defined solely by one or more IP addresses or one or more MAC addresses, and that ports and protocols are not required to instantiate a VM VNIC.

In some embodiments of the invention, a VM VNS (138, 140, 144) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, a VM VNS (138, 140, 144) is configured to send and/or receive packets from one or more associated packet destinations (148, 150, 152). Further, a VM VNS (138, 140, 144) is configured to send and/or receive packets from an associated VM VNIC (132, 134, 136). In addition, a VM VNS (138, 140, 144) may include functionality, as needed, to perform additional processing on the incoming and outgoing packets. This additional processing may include, but is not limited to, cryptographic processing, firewall routing, etc.

Figure 1B:
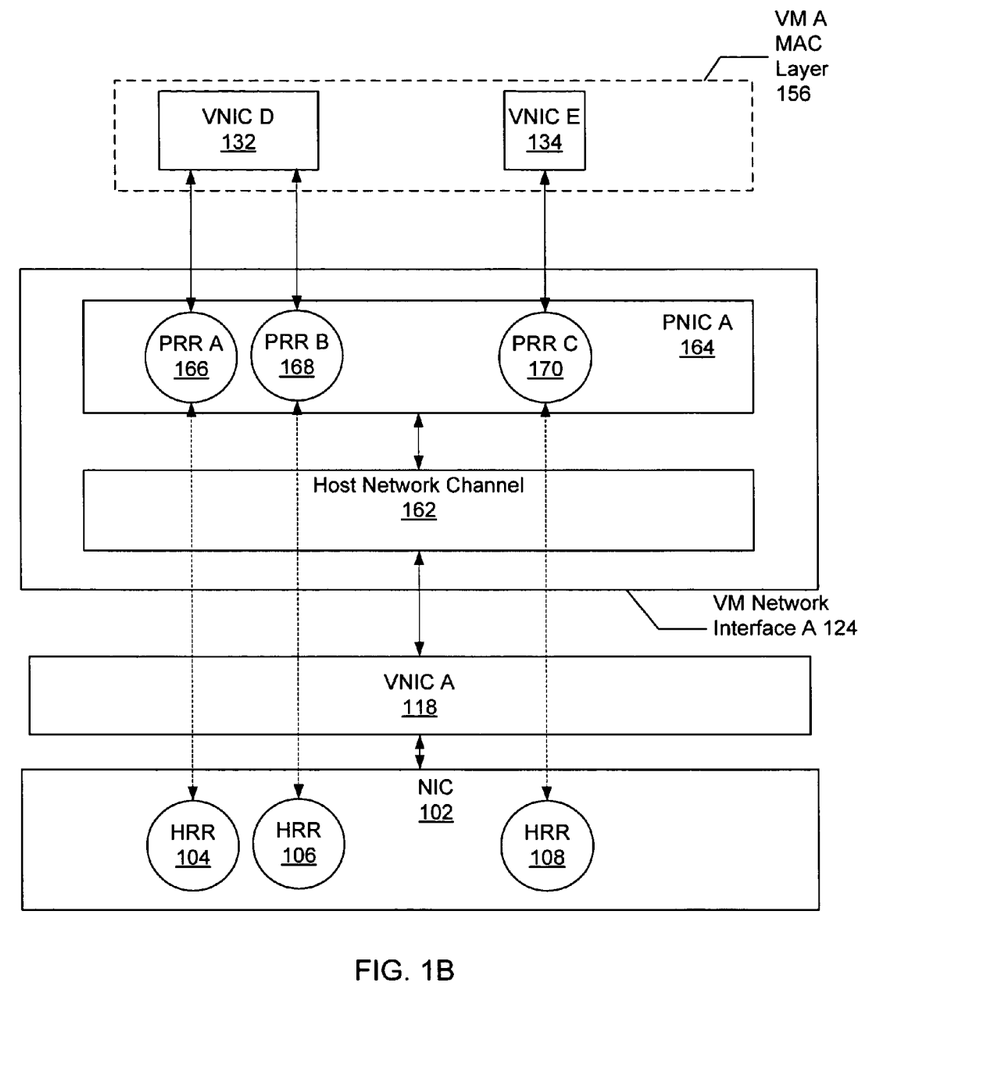
Figure 1C:
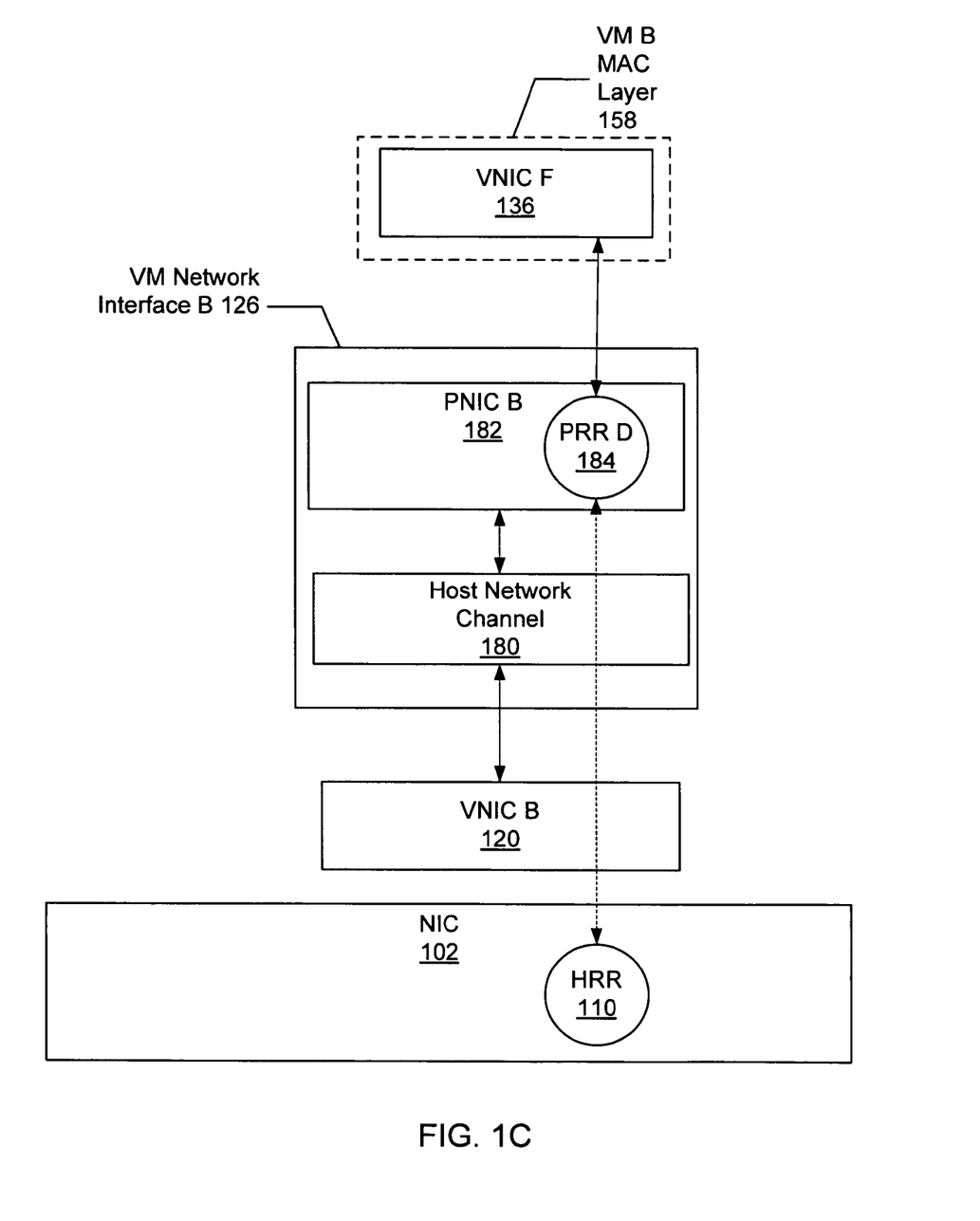

In some embodiments of the invention, the VM network interfaces (124, 126) enable communications between the VMs (128, 130) and host VNICs (118, 120). FIGS. 1B and 1C show the VM network interfaces (124, 126) of FIG. 1A in more detail. In some embodiments of the invention, a VM network interface (124, 126) includes a host network channel (162, 180) and a PNIC (164, 182). In one or more embodiments of the invention, a PNIC (164, 182) includes a pseudo receive ring (166, 168, 170, 184) corresponding to each hardware receive ring (104, 106, 108, 110) assigned to a host VNIC (118, 120) operatively connected to the PNIC (164, 182). In one embodiment of the invention, the pseudo receive rings (166, 168, 170, 184) correspond to portions of memory within a VM (128, 130) and are used to temporarily store received packets. In one or more embodiments of the invention, the pseudo receive rings (166, 168, 170, 184) may be implemented as linked lists, arrays, or any other suitable data structure.

A VM network interface (124, 126) is configured to allow a guest OS (not shown) to communicate with a PNIC (164, 182) as if the guest OS (not shown) is communicating with a driver of a physical NIC. In one or more embodiments of the invention, a VM network interface (124, 126) includes functionality to convert the memory mappings of incoming packets from host OS memory to the memory of a guest OS and vice versa for outgoing packets.

Functionality included in a host VNIC (118, 120) and a host network channel (162, 180) causes packets sent to the host receive rings (104, 106, 108, 110) to be received in the corresponding pseudo receive rings (166, 168, 170, 184). (see e.g., FIG. 1B)

In some embodiments of the invention, a guest OS (not shown) may include functionality to configure a VM MAC layer (156, 158) and one or more VM VNSs (138, 140, 144) in the VM (128, 130) to use the network hardware resources allocated to the VM (128, 130) through the associated host VNIC (118, 120). In some embodiments of the invention, functionality to configure a VM MAC layer (156, 158) may include functionality to create one or more VM VNICs (132, 134, 136) in the VM MAC layer (156, 158) and assign the network hardware resources allocated to host VNICs (118, 120) that are associated with a VM (128, 130) to the VM VNICs (132, 134) (see e.g., FIG. 1B).

In some embodiments of the invention, the VM network interfaces (124, 126) implement a protocol for notifying a VM MAC layer (156, 158) of modifications made in the network hardware resources allocated to the host VNICs (118, 120). In one embodiment of the invention, the host MAC layer (160) includes functionality to automatically send a notification to host network channel (162, 180) when a modification is made in the allocation of network hardware resources to a host VNIC (118, 120). The host network channel (162, 180) includes functionality to propagate this notification to a PNIC (164, 182) by placing an event corresponding to the modification in an event queue accessible by the PNIC (164, 182). Event handling functionality in the PNIC (164, 182) removes the event from the event queue, and reprograms the PNIC (164, 182), as needed, to adapt to the modification. The PNIC (164, 182) also includes functionality to send a notification of the modification to the associated VM MAC layer (156, 158) if the modification affects the VM MAC layer (156, 158).

In some embodiments of the invention, a PNIC (164, 182), a VM MAC layer (156, 158), and one or more VM VNSs (132, 134, 136) on top of the VM MAC layer (156, 158) form layers of a VMNS configured to automatically adapt to modifications made in the allocation of network hardware resources to a host VNIC (118, 120) corresponding to the VMNS.

Referring now to FIG. 1B, the guest OS executing on VM A (128) may create two VM VNICs (132, 134) and associate one of the hardware receive rings (104, 106, 108) assigned to VNIC A (118) to VM VNIC E (134), and the other two hardware receive rings (104, 106, 108) assigned to VNIC A (118) to VM VNIC D (132). The guest OS creates the association of hardware receive rings to VM VNICs by binding VNIC E (134) to pseudo receive ring C (170) and VNIC D (132) to pseudo ring A (166) and pseudo ring B (168).

Further, as shown in FIG. 1B, three hardware receive rings (104, 106, 108) are assigned to VNIC A (118) which is operatively connected to a PNIC (164) in a VM network interface (124). PNIC A (164) includes three pseudo receive rings (166, 168, 170), each respectively corresponding to the three hardware receive rings (104, 106, 108). The packets sent to each of the hardware receive rings (104, 106, 108) by a classifier on the NIC (102) are in turn sent to the corresponding pseudo receive ring (166, 168, 170) in PNIC A (164) by functionality in VNIC A (118) and the host network channel (162).

Continuing with the discussion of FIG. 1B, the VM A MAC layer (156) includes two VM VNICs, namely, VNIC D (132) and VNIC E (134). As discussed above, PNIC A (164) in VM network interface A (156) includes three pseudo receive rings (166, 168, 170), each corresponding to one of the hardware receive rings (104, 106, 108) assigned to VNIC A (118). Furthermore, pseudo receive ring A (166) and pseudo receive ring B (168) are assigned to VNIC D (132) and pseudo receive ring C (170) is assigned to VNIC E (134). Referring to FIG. 1A, VM VNS D (138) and VM VNS E (140) are configured on top of the VM A MAC layer (156) and are respectively associated with VNIC D (132) and VNIC E (134). Thus, the VMNS of VM A (128) includes PNIC A (164), the VM A MAC layer (156), VM VNS D (138), and VM VNS E (140).

Referring now to FIG. 1C, the VM B MAC layer (158) includes a single VM VNIC, VNIC F (136). PNIC B (182) in VM network interface B (126) includes one pseudo receive ring (184) that is assigned to VNIC F (136) and corresponds to the hardware receive ring (110) assigned to VNIC B (120). Referring to FIG. 1A, VM VNS F (144) is configured on top of the VM B MAC layer (158) and is associated with VNIC F (136). Thus, the VMNS of VM B (130) includes PNIC B (182), the VM B MAC layer (158), and VM VNS F (144).

Figure 2:
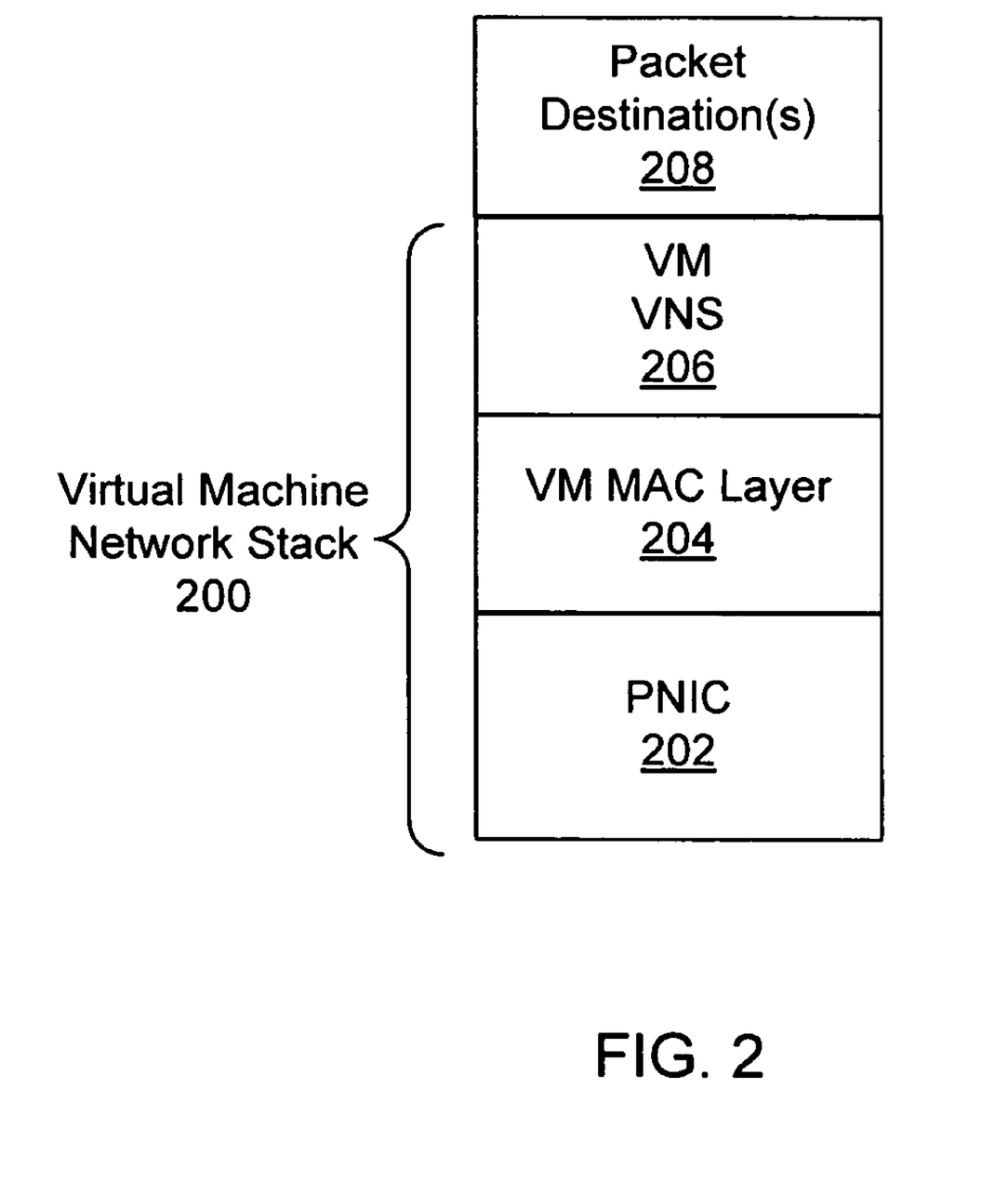
FIG. 2 shows a virtual machine network stack in accordance with one or more embodiments of the invention.

FIG. 2 shows a VMNS (200) in more detail in accordance with one or more embodiments of the invention. In one or more embodiments of the invention, a VMNS (200) includes functionality to automatically reconfigure layers (202, 204, 206) of the VMNS (200) to adapt to modifications in the network hardware resources allocated to a host VNIC corresponding to the VMNS (200) if such adaptation is needed. That is, if a modification is made in the network hardware resources allocated to the host VNIC, whether made dynamically by a host OS in response to changing network traffic conditions or manually by a systems administrator, each affected layer of the VMNS (200) is reprogrammed or reconfigured as needed to operate using the modified network hardware resources without further instruction from the host OS or systems administrator.

In some embodiments of the invention, when a modification is made in the allocated network hardware resources, functionality in a host MAC layer generates a notification of the modification and sends the notification to the PNIC (202) as previously described. In one embodiment of the invention, information associated with the notification identifies the type of modification made (e.g., the removal of a hardware receive ring from the associated host VNIC). The PNIC (202) passes this notification to the VM MAC layer (204), which in turn passes the notification to the VM VNS layer (206). Each of the aforementioned layers (202, 204, 206) includes functionality to adapt the layer's operation to the modification indicated by the notification if such adaptation is needed. In some embodiments of the invention, the layers (202, 204, 206) may register to be notified of certain types of modifications made to the network hardware resources allocation (e.g., those modifications that potentially affect the operation of the layer) rather than being notified of all modifications.

Figure 3A:
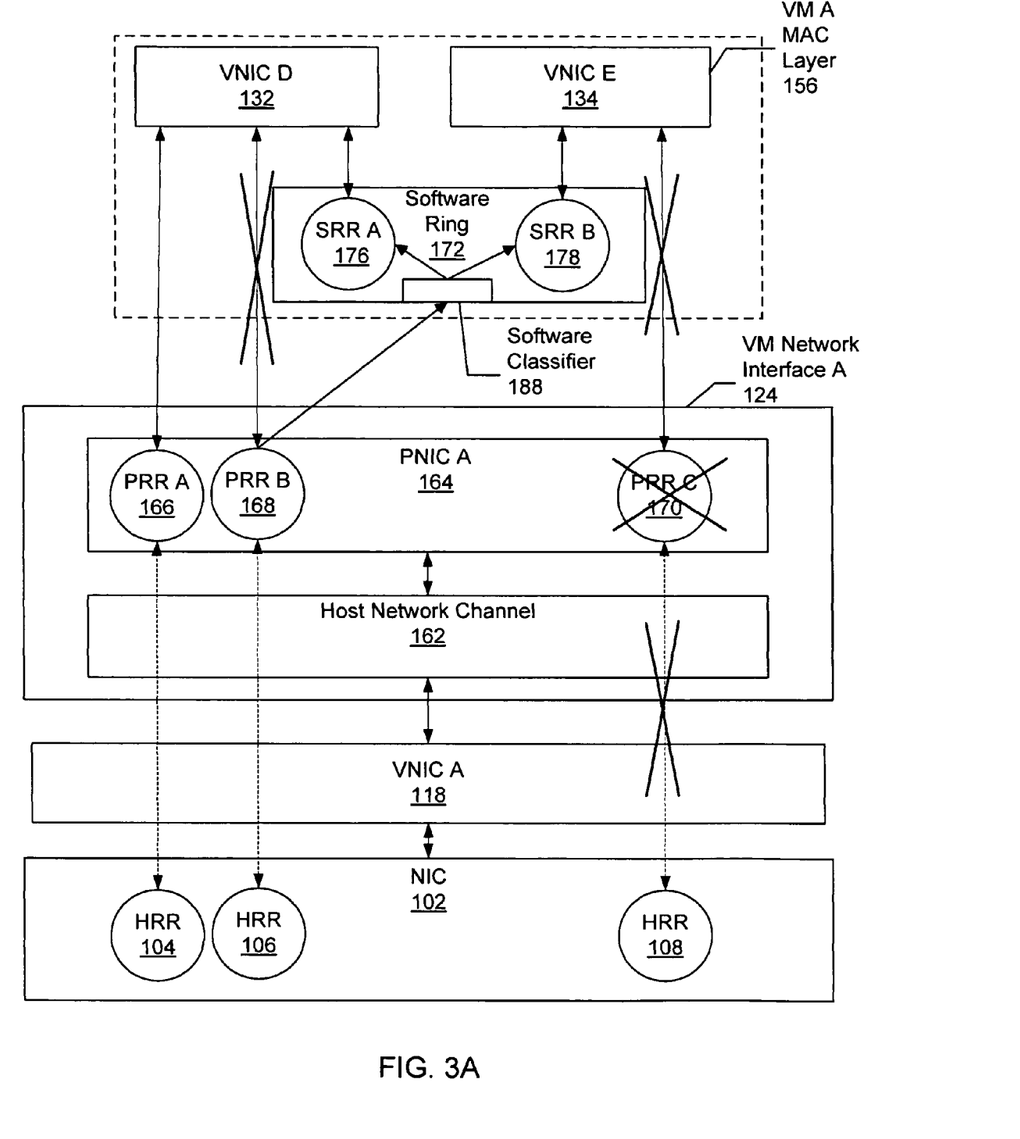
Figure 3B:
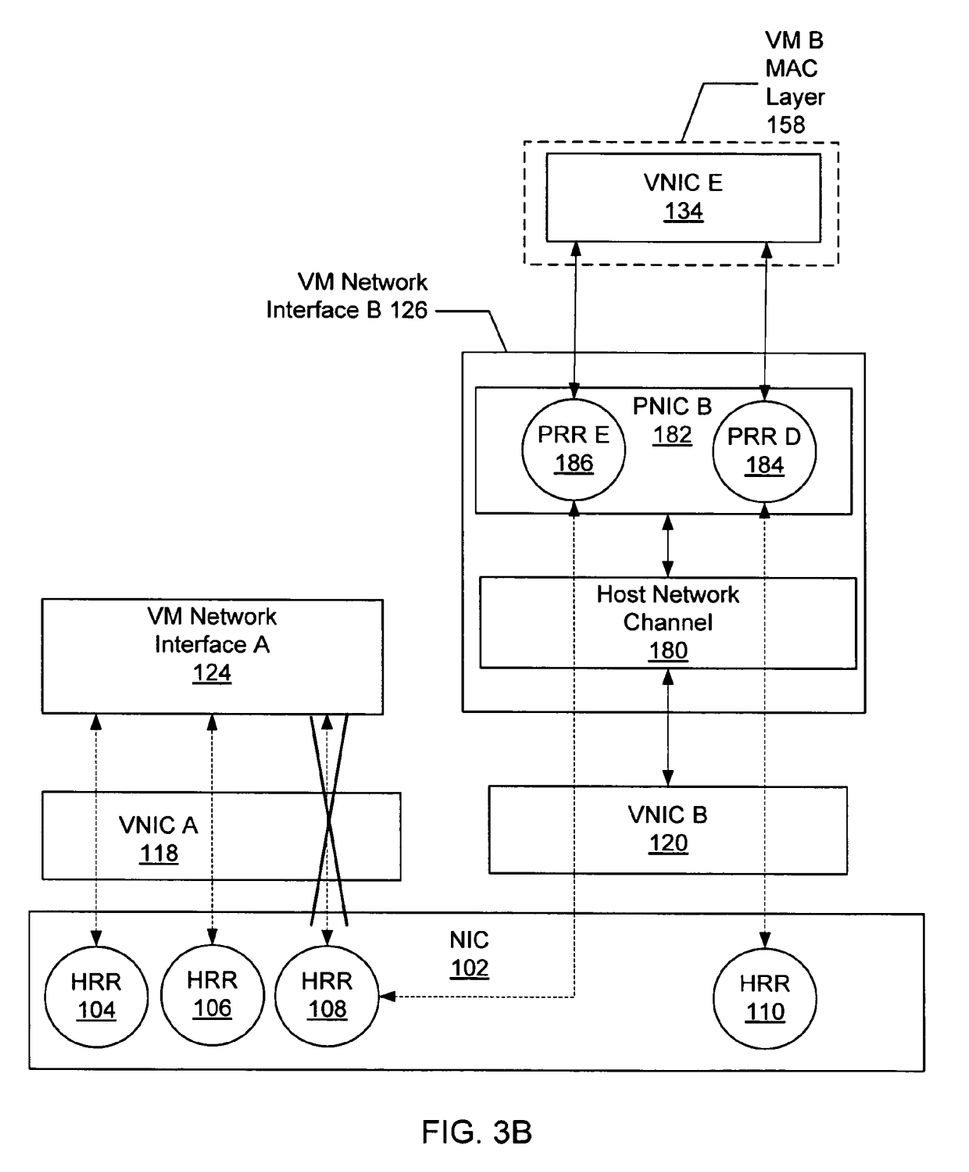

FIGS. 3A and 3B show an example of automatic reconfiguration of a VMNS in accordance with one or more embodiments of the invention. In this example, a system is originally configured as shown in FIGS. 1A, 1B, and 1C.

Referring to FIGS. 3A and 3B, assume that the host OS made modifications to the allocation of network hardware resources that include removing a hardware receive ring (108) from VNIC A (118) and assigning the hardware receive ring (108) to VNIC B (102). Responsive to these modifications, the classifier (not shown) in the NIC (102) is programmed to send packets previously directed to the reassigned hardware receive ring (108) to another hardware receive ring (106) assigned to VNIC A (118). The classifier (not shown) is also programmed to send packets addressed to the packet destinations (not shown) in VM B (130) to both the hardware receive ring (110) previously assigned to VNIC B (120) and the reassigned hardware receive ring (108) according to some criteria.

When the host OS performs these modifications, the host MAC layer (not shown) is notified of each modification. As shown in FIG. 3A, without further direction from the host OS (i.e., automatically), the host MAC layer (not shown) reconfigures VNIC A (118) to no longer receive packets from the removed hardware receive ring (108) and to no longer send those packets to the associated pseudo ring C (170) via the host network channel (162). The host MAC layer (not shown) also sends the notification of the removal of the hardware receive ring (108) to the host network channel (162). The host network channel (162) receives the notification and passes the notification to PNIC A (164).

In response to receiving the notification, PNIC A (164) is reconfigured to remove pseudo receive ring C (170) and to send packets previously sent to pseudo receive ring C (170) to pseudo receive ring B (168). PNIC A (164) also sends the notification to the VM A MAC layer (156). Upon receiving the notification, functionality in the VM A MAC layer (156) adapts the layer to the modification. A software ring (172) is created to receive packets from pseudo receive ring B (168). The software ring (172) includes software receive ring A (176) assigned to VNIC D (132) and software receive ring B (178) assigned to VNIC E (134). The software ring (172 also includes a software classifier (188) programmed to send packets with addresses corresponding to packet destinations associated with VNIC E (134) (i.e., those packets previously received from the removed hardware receive ring (108)) to software receive ring B (178) and packets with addresses corresponding to packet destinations associated with VNIC D (132) to software receive ring A (176). VNIC D (132) and VNIC E (134) are also reconfigured to receive packets from software receive ring A (176) and software receive ring B (178), respectively. PNIC A (164) is further reconfigured to send packets received in pseudo ring B (168) to the software ring (172). Once the adaptation of the layer is complete, the VM A MAC layer (156) sends the notification to the VM VNSs (not shown) on top of the VM A MAC layer (156).

As shown in FIG. 3B, responsive to the notification of the assignment of an additional hardware receive ring (108) to VNIC B (120), the host MAC layer (not shown) reconfigures VNIC B (120) to receive packets from the newly assigned hardware receive ring (108) and to send those packets to PNIC B (182) via the host network channel (162). The host MAC layer (not shown) also sends the notification of the addition of the hardware receive ring (108) to the host network channel (180). The host network channel (180) receives the notification and passes the notification to PNIC B (182).

In response to receiving the notification, PNIC B (182) is reconfigured to add pseudo receive ring E (186) corresponding to the added hardware receive ring (108) and to send packets received from the added hardware receive ring (108) to pseudo receive ring E (186). PNIC B (182) also sends the notification to the VM B MAC layer (158). Upon receiving the notification, functionality in the VM B MAC layer (158) adapts the layer to the modification by reconfiguring VNIC E (134) to receive packets from pseudo receive ring E (186). Once the adaptation of the layer is complete, the VM B MAC layer (158) sends the notification to the VM VNS (not shown) on top of the VM B MAC layer (156).

Figure 4:
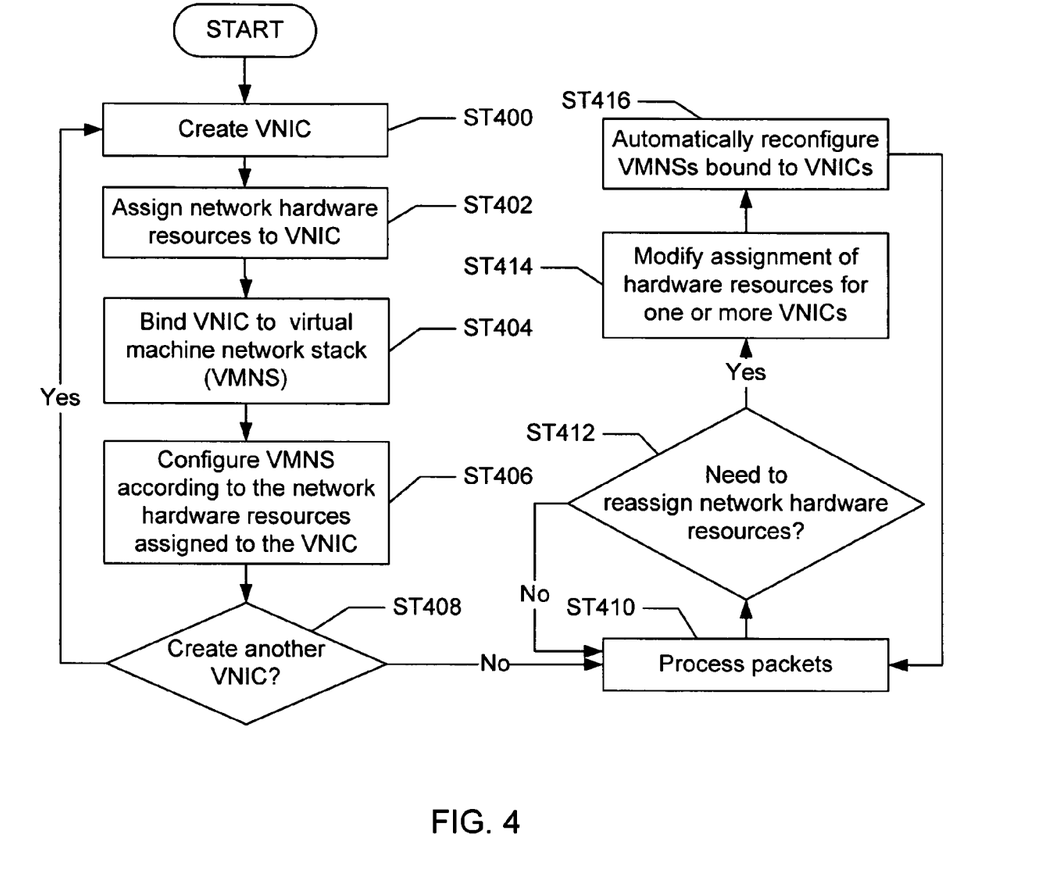
FIG. 4 shows a flow diagram in accordance with one or more embodiments of the invention.

FIG. 4 shows a flowchart of a method for automatically reconfiguring a VMNS in response to a modification in an allocation of network hardware resources used by the VMNS in accordance with one or more embodiments of the invention. While the various steps in this flowchart are presented and described sequentially, one of ordinary skill will appreciate that some or all of the steps may be executed in different orders and some or all of the steps may be executed in parallel. As shown in FIG. 4, a host and one or more VMs executing on the host are configured for sending and receiving packets to/from one or more packet destinations in the one or more VMs. A VNIC is created (ST400) and some portion of the available host network hardware resources (e.g., hardware rings, hardware ring capacities, MAC addresses, etc.) is assigned to the VNIC (ST402). The VNIC is bound to a VMNS in a VM (ST404) and the VMNS is configured to use the portion of host network hardware resources assigned to the VNIC (ST 406). The configuration process (ST400-ST406) is repeated until each VM having packet destinations has been assigned a portion of the network hardware resources (ST408).

Subsequent to the configuration process (ST400-406), the host and the VMs process packets received from the network and packets sent from the various packet destinations to the network using the host network resources in accordance with the assigned portions (ST410). During this processing, a need to reassign network hardware resources assigned to one or more VNICs may be identified (ST412). In some embodiments of the invention, such a need may be identified by monitoring software executing on the host that monitors utilization of the network hardware resources. In some embodiments of the invention, a systems administrator may determine that reassignments are needed. Until a need for reassignment is identified, processing of packets continues using the current network hardware resource assignments (ST410-ST412).

If a need to reassign network hardware resources is identified, modifications are made to the portions of network hardware resources assigned to one or more VNICs as needed (ST414). In some embodiments, the modifications may be made by a host OS when the need is identified by the monitoring software. In some embodiments, a system administrator may manually perform the modifications. When the modifications are made, each VMNS bound to a VNIC whose assigned portion of network hardware resources was modified is automatically reconfigured to adapt to the modified portion of network hardware resources (ST416).

Figure 5:
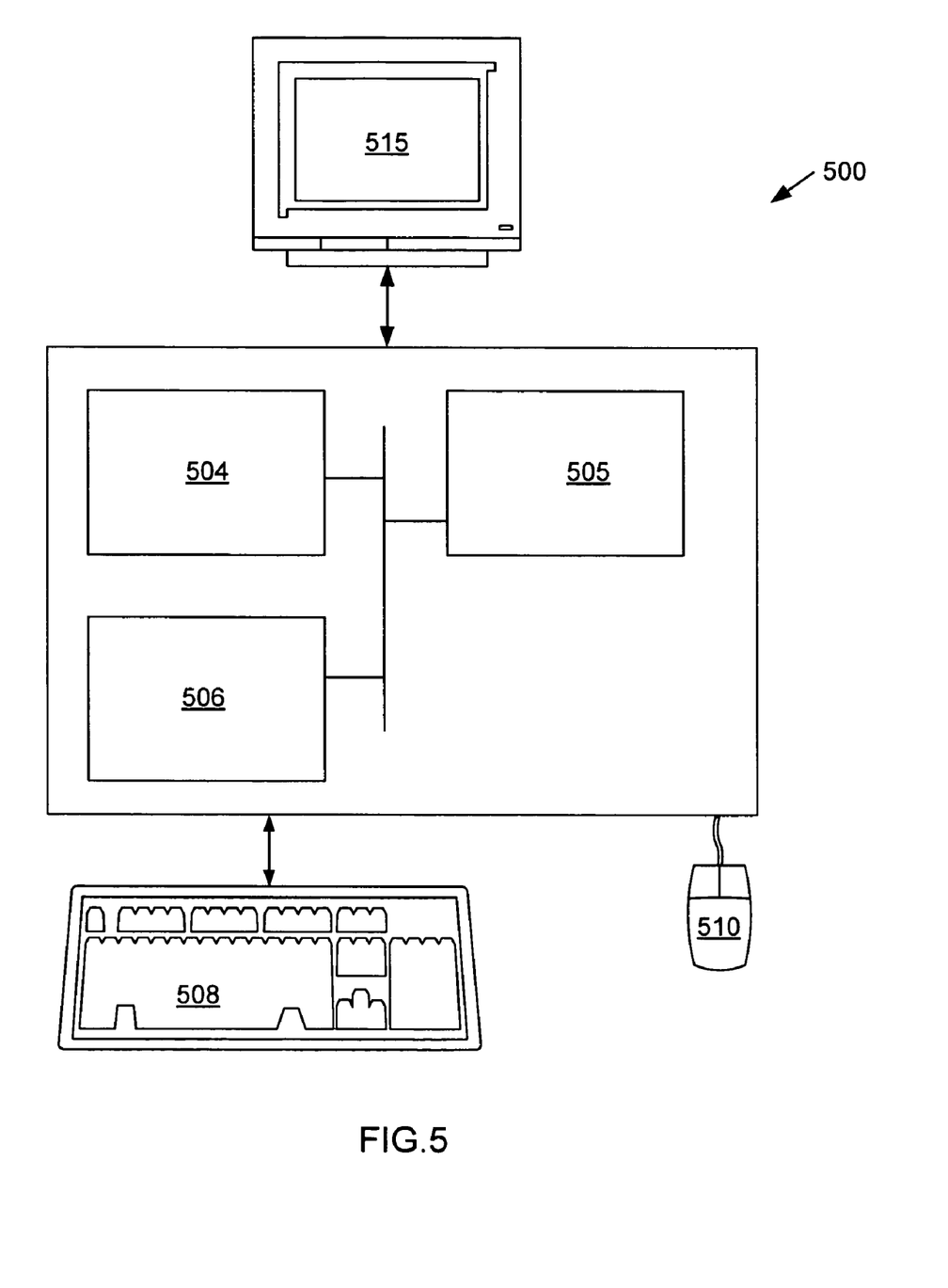
FIG. 5 shows a computer system in accordance with one or more embodiments of the invention.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., network interface card, virtual network interface card, software ring, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
 a host comprising network hardware resources;
 a virtual machine (VM) located on the host;
 a virtual network interface card (VNIC) configured on the host and operatively connected to the VM, wherein a portion of the network hardware resources is assigned to the VNIC;
 a virtual machine network stack (VMNS) configured in the VM and operatively connected to the VNIC,
  wherein the VMNS comprises a pseudo network interface card (PNIC),
  wherein a first hardware ring in the portion of network hardware resources corresponds to a first pseudo ring of the PNIC,
  wherein the VMNS is configured to use the portion of network hardware resources,
  wherein the host is configured to perform a modification to the portion of network hardware resources,
  wherein the modification comprises changing a capacity of the first hardware ring,
  and wherein the VMNS, the VNIC, and the PNIC are automatically reconfigured to adapt to the modification.

2. The system of claim 1, wherein a layer of the VMNS is configured to receive a notification of the modification if the layer is affected by the modification, wherein the layer is configured to adapt to the modification.

3. The system of claim 1, further comprising:
 a host MAC layer configured to propagate a notification of the modification to a VM MAC layer.

4. The system of claim 1, further comprising:
 a host MAC layer;
 a VM MAC layer in the VMNS;
  a host network channel operatively connected to the host MAC layer, wherein the
  PNIC is operatively connected to the host network channel and the VM MAC layer,
  wherein the host MAC layer is configured to send a notification of the modification to the host network channel when the host performs the modification, wherein the host network channel is configured to send an event corresponding to the notification to the PNIC, and wherein the PNIC is configured to send a notification corresponding to the event to the VM MAC layer.

5. The system of claim 1, wherein a network hardware resource is one selected from a group consisting of a hardware receive ring, a hardware transmit ring, a capacity of a hardware receive ring, a capacity of a hardware transmit ring, and a MAC address.

6. A non-transitory computer readable medium comprising computer readable program code embodied therein for causing a computer system to:

assign a portion of network hardware resources of a host to a VNIC;

configure a virtual machine network stack (VMNS) in a virtual machine (VM) bound to the VNIC to use the portion of network hardware resources assigned to the VNIC;

configure a pseudo network interface card (PNIC) of the VMNS, wherein a first hardware ring in the portion of network hardware resources corresponds to a first pseudo ring of the PNIC;

perform a modification to the portion of network hardware resources; and automatically reconfigure the VMNS to adapt to the modification by reconfiguring the VNIC and the PNIC to adapt to the modification, wherein the modification comprises changing a capacity of the first hardware ring.

7. The non-transitory computer readable medium of claim 6, wherein the computer readable program code further causes the computer system to notify a layer of the VMNS of the modification if the layer is affected by the modification, wherein the layer adapts to the modification.

8. The non-transitory computer readable usable medium of claim 6, wherein the computer readable program code further causes the computer system to register a layer of the VMNS to receive a notification of the modification, and to send the notification to the layer, wherein the layer adapts to the modification.

9. The non-transitory computer readable medium of claim 6, wherein the computer readable program code further causes the computer system to propagate a notification of the modification from a host MAC layer to a VM MAC layer.

10. The non-transitory computer readable medium of claim 9, wherein the computer readable program code further causes the computer system to propagate the notification by:

sending the notification from the host MAC layer to a host network channel;

sending an event corresponding to the notification from the host network channel to the PNIC; and sending a notification corresponding to the event from the PNIC to the VM MAC layer.

11. The system of claim 1, wherein the VMNS is further configured to register a layer of the VMNS to receive a notification of the modification, and wherein the VMNS, the VNIC, and the PNIC are automatically reconfigured by notifying the layer of the modification, wherein the layer adapts to the modification.

12. The system of claim 1, wherein the VMNS, the VNIC, and the PNIC are automatically reconfigured by propagating a notification of the modification from a host Media Access Control (MAC) layer to a VM MAC layer.

13. The system of claim 12, wherein propagating the notification comprises:

sending the notification from the host MAC layer to a host network channel;

sending an event corresponding to the notification from the host network channel to the PNIC; and sending a notification corresponding to the event from the PNIC to the VM MAC layer.

\* \* \* \* \*

UNITED STATES PATENT AND TRADEMARK OFFICE
CERTIFICATE OF CORRECTION

PATENT NO. : 7,788,411 B2  Page 1 of 1
APPLICATION NO. : 11/490582
DATED : August 31, 2010
INVENTOR(S) : Kais Belgaied et al.

It is certified that error appears in the above-identified patent and that said Letters Patent is hereby corrected as shown below:

In Claim 8, Column 13, line 36 the words "readable usable medium"
should appear as --readable medium--.

Signed and Sealed this

Twenty-first Day of December, 2010

David J. Kappos
*Director of the United States Patent and Trademark Office*